April 21, 1953 P. ANDERSON 2,636,147
CARBON ARC WELDING APPARATUS
Filed Jan. 7, 1950 2 SHEETS—SHEET 1
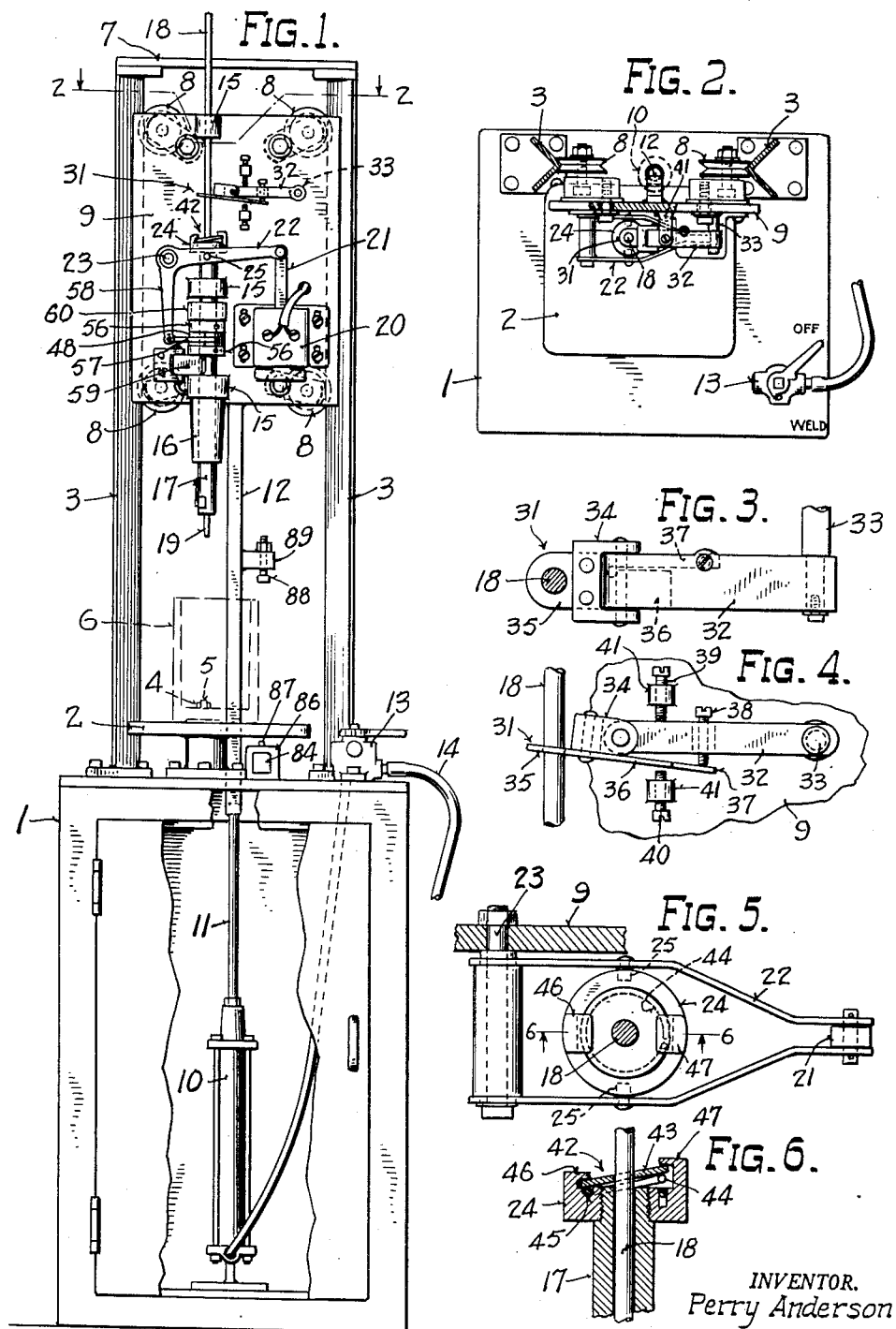
INVENTOR.
Perry Anderson
BY Andrus & Sceales
ATTORNEYS.

April 21, 1953 P. ANDERSON 2,636,147
CARBON ARC WELDING APPARATUS
Filed Jan. 7, 1950 2 SHEETS—SHEET 2
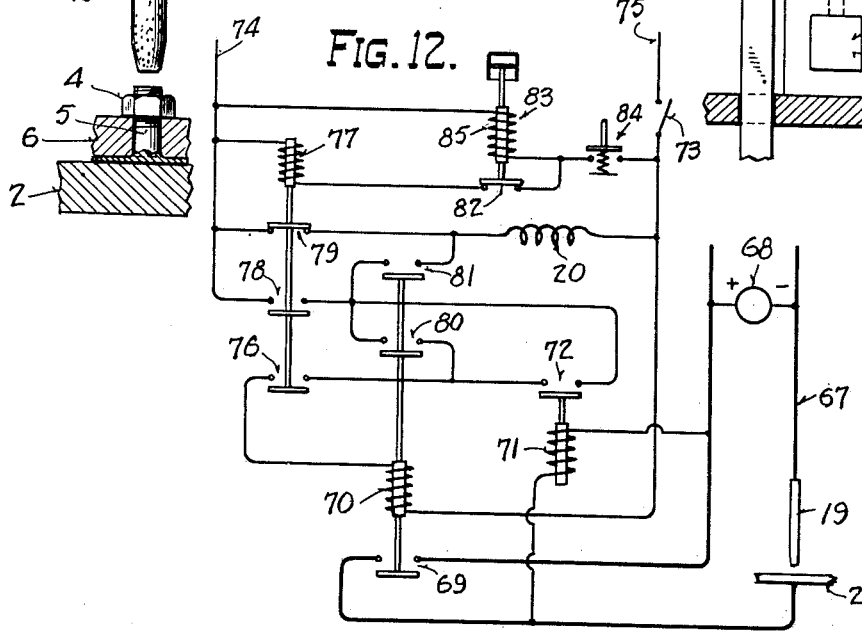
INVENTOR.
Perry Anderson
BY Andrus & Sceales
ATTORNEYS.

Patented Apr. 21, 1953

2,636,147

UNITED STATES PATENT OFFICE 2,636,147

CARBON ARC WELDING APPARATUS

Perry Anderson, Milwaukee, Wis., assignor to A. O. Smith Corporation, Milwaukee, Wis., a corporation of New York Application January 7, 1950, Serial No. 137,464

19 Claims. (Cl. 314—39)

This invention relates to carbon arc welding apparatus.

An object of the invention is to provide a carbon arc welding apparatus which will easily and rapidly make welds in relatively inaccessible recesses.

Another object of the invention is to provide a carbon arc welding device which automatically feeds the carbon electrode after it has burned or broken off.

Another object is to provide a welding apparatus with which a number of welds may be made with uniform arc length and uniform weld period.

Another object of the invention is to provide a carbon arc welding apparatus which automatically rotates the electrode to promote uniformity of burning.

The apparatus, in general, comprises an electrode holding barrel mounted on a back plate for vertical movement with relation thereto, a solenoid and linkage arranged on the back plate to actuate the barrel and electrode, and an air cylinder and piston disposed beneath the back plate to vertically move the same along a pair of guide tracks. A relay system, actuated when the back plate is in its lower position, automatically controls the solenoid, as well as the contactor in the welding current circuit, so that the electrode is operated to strike the arc and a weld of short duration is made. Ratchet mechanisms are provided both to feed the electrode, and thus maintain a uniform arc length, and to intermittently rotate the electrode to promote uniformity of burning.

Other objects and advantages will be set forth more fully in the following description of an embodiment of the invention as illustrated in the accompanying drawings.

In the drawings:

Figure 1 is a front elevation of the apparatus with portions broken away to show details of structure;

Fig. 2 is a horizontal section taken at line 2—2 of Fig. 1;

Fig. 3 is a top view of the feeding ratchet;

Fig. 4 is a side elevation of the feeding ratchet including the limiting set screws;

Fig. 5 is a top detail view of the holding ratchet and the yoke which supports the electrode holding barrel;

Fig. 6 is a vertical section of the holding ratchet taken along line 6—6 of Fig. 5;

Fig. 7 is a horizontal section of the brush which feeds current into the electrode holding barrel;

Fig. 8 is a top view of the rotating ratchet with portions broken away to show structural details;

Fig. 9 is a vertical section of the lower end of the electrode holding barrel;

Fig. 10 is a horizontal section taken at line 10—10 of Fig. 9;

Fig. 11 is a detail view of the stop and micro switch box of Fig. 1; and

Fig. 12 is a schematic wiring diagram of the electrical circuits of the apparatus.

Referring to the drawings, the structure may include a rigidly constructed cabinet 1 the upper surface of which is adapted with bolts or the like to support a suitable worktable 2 and a pair of upwardly projecting guides 3. The worktable 2 has positioned thereon an article to be welded, for example, a nut 4 to be fused to a bolt 5 which extends inwardly from the closed end of a hollow piston 6.

The guides 3, illustrated as a pair of angle irons connected at their upper ends by a brace 7, serve as tracks for a plurality of grooved wheels 8 which are mounted at each corner of a vertical back plate 9. The back plate 9 is thus free to move vertically but is restrained by the guides 3 from rotational, vibratory, or other undesirable movement.

The back plate 9 may be elevated or lowered by means of an air cylinder 10 and piston 11, both of which are disposed in the cabinet 1 with the air cylinder 10 rigidly secured to the lower end thereof. The piston 11 is connected to the back plate 9 by a bar 12 which extends vertically through an aperture in the upper surface of the cabinet 1 and is preferably welded to the objects which it connects.

The flow of air from a compressed air source to the air cylinder 10 is governed by a two-position valve 13 in an air hose 14. The valve 13 may be secured in any convenient place, such as the top surface of cabinet 1. When the valve 13 is turned to its "weld" position, the air is released from the cylinder 10 and the back plate 9 falls towards the article to be welded. The turning of the valve 13 to its "off" position causes compressed air to flow into the cylinder 10 and thereby elevate piston 11 and back plate 9.

Although the valve 13 is shown in the drawings as being of the manually operated type, a suitable control could be easily provided for the purpose of making the welding operation entirely automatic.

The front of back plate 9 is provided with a number of axially aligned bearing lugs 15 which, together with a sleeve 16 depending from the lower lug 15, serve as guides for a vertically movable tubular barrel 17 and a metal rod 18 which projects from the upper end thereof. The rod 18 and a carbon electrode 19 are mounted axially of the barrel 17 so that they are in contact at about its center. The rod 18 may then serve, when actuated in a manner to be described subsequently, to feed the electrode 19 after it has burned or broken off.

By the use of a sufficiently long electrode 19 the rod 18 could be omited. For reasons of strength and wear resistance, however, it is preferable that the rod 18 be used.

The actuating means for the barrel 17 may include a solenoid 20 adjustably secured to back plate 9 and having a vertically movable core 21 connected to the narrow end of a yoke 22. The yoke 22, as shown in Fig. 5, is disposed transversely of barrel 17 and is pivoted at its wide end on a bolt 23 which extends forwardly from back plate 9 and serves as a fulcrum. Barrel 17 is provided at its upper end with an annular flange 24 so that it may be supported, but left free for rotation about its axis, by a pair of pins 25 which project inwardly from the center of yoke 22.

The barrel 17 is thus elevated when the energization of solenoid 20 causes it to attract its core 21 upwardly, with consequent upward pivot of the yoke 22 about fulcrum bolt 23.

Serving to hold the electrode 19, and thus the rod 18, in the barrel 17 is a leaf spring 26 shown in Fig. 9 as mounted longitudinally of the barrel 17 in a rectangular shaped groove 27 at the lower end thereof. The spring 26 is preferably hooked at its lower end to resiliently urge a segment 28, which fits into a corresponding recess in the barrel 17, against the electrode 19. The segment 28 is provided with an outer groove 29 cut to register with the groove 27 in barrel 17, and an inner groove 30 which corresponds with the bore in barrel 17. Groove 30 is preferably chamfered at its ends to allow easy insertion of the electrode 19 into the barrel 17.

In order to maintain a uniform arc length it is necessary that the electrode 19 be fed towards the work after it has burned or broken off. This may be done automatically by a feeding ratchet 31 positioned transversely of the rod 18 a short distance above the upper end of the barrel 17.

Referring to Figs. 3 and 4, ratchet 31 preferably includes a horizontal arm 32 pivotally connected at one end to a stud 33 which projects from back plate 9, a rocker member 34 disposed adjacent rod 18 and hinged to the free end of arm 32, and a flat spring 35 pinned at about its center to the underside of the rocker 34.

The spring 35 is apertured at one end to fit around rod 18 and is preferably bifurcated at the other end, in order to increase its resiliency, to form a short wide portion 36 and a long narrow portion 37. Serving to maintain spring 35 in an oblique position, so that it binds with rod 18, is a cap screw 38 which is threaded downwardly through arm 32 and bears against the outer end of the long narrow portion 37 of spring 35. The operation of the described construction is such that the rod 18 may move downwardly but not upwardly with respect to the spring 35.

In order to limit the upward and downward movements of the arm 32, upper and lower set screws 39 and 40 are threaded through corresponding lugs 41 which are mounted on the back plate 9. The arrangement of lugs 41 is such that when the arm 32 is in its lower position the short wide portion 36 of spring 35 is in engagement with the lower set screw 40. Set screws 39 and 40 are adjusted to allow spring 35 to ride freely with rod 18 for a distance which is equal to the desired arc length.

Assuming that when the barrel 17 is in its lower position the arm 32 is also in its lower position, upward movement of barrel 17 for a distance equal to the arc length causes the arm 32 to contact the upper set screw 39. Further upward movement of barrel 17 causes the rod 18, and thus the electrode 19, to feed downwardly through the barrel 17, since rod 18 is held stationary by the spring 35 as soon as the arm 32 contacts the upper set screw 39.

Subsequent lowering of the barrel 17 for a distance equal to the arc length causes the short wide arm 36 of spring 35 to contact the lower set screw 40, tending to bend the spring 35 and thereby aid in releasing the rod 18. Upon additional lowering of barrel 17, the rod 18 feeds downwardly through the spring 35.

In constructions where the weight of the rod 18 is insufficient to cause it to feed downwardly through the spring 35 against the frictional resistance thereof, means may be provided to prevent the rod 18 from separating from the electrode 19 as the barrel 17 is lowered. These means may take the form of a holding ratchet 42 disposed at the top surface of the barrel 17 subjacent ratchet 31.

The holding ratchet 42, as shown in Figs. 5 and 6, may comprise a suitable washer 43 mounted around rod 18 and resiliently held in oblique binding relation therewith by a circular spring 44. The spring 44 is anchored in an annular groove 45 at the top surface of barrel 17 and inclines upwardly to engage the washer 43.

Upward movement of the washer 43 is limited by a small angular stop 46 and a larger angular stop 47, both of which are integral with the flange 24 on the barrel 17. The small stop 46 is disposed with its horizontal portion slightly above the lower edge of washer 43, while the larger stop 47 is arranged diametrically opposite stop 46 with its horizontal portion above the elevated edge of washer 43.

The action of ratchet 42 is such that the rod 18 and thus electrode 19 may be fed downwardly with respect to the barrel 17, but upward movement with respect thereto is positively prevented. Consequently, the rod 18 may not be held stationary, and thus separated from the electrode 19, as the barrel 17 moves downwardly.

In addition to its function of keeping the electrode 19 and the rod 18 from separating, ratchet 42 aids in preventing the electrode 19 from being moved upwardly with respect to barrel 17 as the electrode 19 strikes an obstruction such as the article to be welded.

The burning of the electrode 19 may be made uniform, with consequent increase of arc stability, by a ratchet 48 which operates to rotate the electrode 19 between each weld. Ratchet 48 is preferably mounted around barrel 17 so that it may be rotated with respect to the barrel 17 when actuated in one direction, but may not be so rotated when actuated in the opposite direction.

Referring to Fig. 8, the ratchet 48 may comprise a generally annular member 49 from which a triangularly shaped portion 50 protrudes, a ball 51 arranged in a recess 52 which is cut in the inner edge of the member 49, and a compressed helical spring 53 disposed in a hole 54 which is bored through the triangular portion 50 of the member 49.

The recess 52 is shaped with a narrow end and a wide end, so that the ball 51 is jammed between member 49 and the barrel 17 when it is at the narrow end but is not thus jammed when it is at the wide end.

The hole 54 extends tangentially of the barrel 17 from the wide end of the recess 52 to a point adjacent the apex of the triangularly shaped portion 50 of the member 49. The helical spring 53 is held in position by a cap screw 55 which is threaded into the outer end of the hole 54 and serves to bias the ball 51 towards the narrow end of the recess 52.

When the member 49 of the ratchet 48 rotates in a counterclockwise direction, the ball 51 tends to jam into the narrow end of the recess 52. The barrel 17 is thus locked with the member 49 and rotates with it. Clockwise rotation of the member 49, however, does not cause rotation of the barrel 17 since the ball 51 tends to move toward the wide end of the recess 52 and therefore does not jam between the barrel 17 and the member 49.

Axial movement of the ratchet 48 with respect to the barrel 17 is prevented by a pair of collars 56 secured to the barrel 17 and preferably disposed to hold the ratchet 48 midway between the two lower bearing lugs 15.

The ratchet 48 is actuated through a suitable linkage 57 which connects the outer end of the triangular portion 50 of the member 49 with the lower end of an arm 58. Arm 58 extends downwardly from the front portion of the yoke 22, with which it is integral at the fulcrum bolt 23.

Energization of the solenoid 20, with consequent counterclockwise movement of the yoke 22 and the arm 58, causes the ratchet 48 and thus barrel 17 to rotate in a counterclockwise direction. De-energization of the solenoid 20 reverses these movements but, as previously described, the barrel 17 does not rotate with the ratchet 48 as the ratchet 48 rotates in a clockwise direction.

By a suitably arranged ratchet the barrel 17 and thus the electrode 19 could be made to rotate in either a clockwise or counterclockwise direction, and upon either energization or de-energization of solenoid 20. This however, is not critical, the important thing being that the electrode 19 be rotated slightly, in either direction, between each weld.

The electrode feed mechanism may be maintained in adjustment when the apparatus is not in use by a tongue 59 which is hinged to the back plate 9 so that it may be swung between the lower bearing lug 15 and the lower collar 56. Tongue 59 operates to prevent the barrel 17 from falling when the solenoid 20 is de-energized and there is no support on which the electrode 19 may rest.

Electrical contact is made with the barrel 17 by means of a brush 60 mounted on barrel 17 between the ratchet 48 and the center bearing lug 15. The brush 60 is shown in detail in Fig. 7 and preferably includes a rectangular band 61 provided with ears or the like to slidably support front and rear bronze contact blocks 62 and 63, respectively, the inner surfaces of the blocks being curved to afford close contact with the barrel 17.

Serving to bias the blocks 62 and 63 against the barrel 17 is a helical spring 64 arranged on a bronze rod 65 in a space between the rear contact block 63 and the rear of the band 61. The bronze rod 65 extends rearwardly from block 63 through an aperture in band 61 and a vertical slot 66 in the back plate 9, with the slot 66 permitting the brush 60 to move vertically with the barrel 17 but not to rotate with it.

In carrying out the electrical circuits, the end of rod 65 is connected through a flexible lead 67 to the back plate 9, which in turn is connected to the negative terminal of a suitable direct current welding generator 68. The positive terminal of the generator 68 is connected via a normally open welding current contact 69 of a relay coil 70 to the worktable 2.

The welding current circuit may then be completed from the positive terminal of generator 68 through contact 69, worktable 2, the article to be welded, electrode 19, barrel 17, brush 60, lead 67, and back plate 9 to the negative terminal of generator 68. Insulation in the mountings of the grooved wheels 8 keeps the back plate 9 electrically separate from the worktable 2 and prevents the shorting of the generator 68.

The welding current contact 69 is shunted by a relay coil 71 having a normally open contact 72. Coil 71 is energized by the generator 68 when the electrode 19 is in contact with the article to be welded and the welding current contact 69 is open, since closing of the welding current contact 69 provides a short circuiting path which the current takes instead of flowing through the coil 71.

The relay system, which is preferably disposed in the cabinet 1, may be energized through a master switch 73 by 110 volt supply lines 74 and 75.

The coil 70 forms part of a series combination which also includes a contact 76 of a relay coil 77, contact 72 of the relay coil 71, and a second contact 78 of relay coil 77, all of said contacts being of the normally open type. This series combination is connected across supply lines 74 and 75 and is arranged so that current may flow from line 75 through coil 70, contact 76, contact 72, and contact 78 to line 74.

The solenoid 20 is connected across lines 74 and 75 in series with a third contact 79 of the relay coil 77. Contact 79 is normally closed, so that solenoid 20 is normally energized and the barrel 17 and electrode 19 normally maintained in elevated position.

Serving to shunt the contact 72 of relay coil 71 is a second contact 80 of the relay coil 70. A third contact 81 of relay coil 70 is connected on one side to the solenoid 20 side of contact 79, and on the other side to the contact 72 side of contact 76.

The relay coil 77 is connected between line 74 and one side of a normally closed contact 82 of a suitable time delay relay 83. The other side of contact 82 is connected via a normally open microswitch 84 to the line 75. The coil 85 of the time delay relay 83 is connected on one side to line 74 and on the other side to the contact 82 side of the microswitch 84.

The time delay relay 83 is constructed with an adjustable dash pot or other means whereby the contact 82 will not open until a period of time, preferably about two or three seconds, after the closing of microswitch 84 has caused energization of the coil 85.

The microswitch 84 may be actuated in any suitable manner, for instance by the movements of the bar 12 which connects the piston 11 and the back plate 9. Accordingly, the microswitch 84 may be disposed in a small rigid box 86 shown in Fig. 11 as secured adjacent the connecting bar 12 on the top surface of the cabinet 1.

The upper side of the box 86 is apertured for insertion of a contact arm 87 which projects upwardly from the microswitch 84. The arm 87 operates to close the microswitch 84 when engaged by the head of a bolt 88 which is threaded upwardly into a lug 89 on the connecting bar 12.

The bolt 88 also serves to engage the top of box 86 and thereby stop the downward movement of the connecting bar 12, back plate 9, and thus electrode 19. Bolt 88 is preferably adjusted to stop the above downward movement when the distance between the lower end of the electrode 19 and the article to be welded is equal to the desired arc length.

The operation of the welding apparatus is as follows: Assume that the back plate 9 is in its upper position, with the electrode 19 above the article to be welded, and that the welding generator 68 has been started and the master switch 73 closed. Solenoid 20 is thus energized, causing it to maintain the barrel 17 and electrode 19 in their elevated position with respect to the back plate 9, so that the tongue 59 may be swung away from the barrel 17.

If necessary, the operator then positions the electrode 19 in the barrel 17 so that when back plate 9 is in its lower position, the distance between the lower end of the electrode 19 and the article to be welded is equal to the desired arc length. The operator also makes sure that the set screws 39 and 40 of the feeding ratchet 31 are adjusted to allow the flat spring 35 to ride freely with the rod 18 for a distance equal to the arc length, and that the horizontal arm 32 is in contact with the upper set screw 39.

The moving of the valve 13 to "weld" position releases the air from the air cylinder 10 and permits the back plate 9, barrel 17, electrode 19, etc., to fall until the head of bolt 88 engages the box 86. The contact arm 87 of microswitch 84 is then depressed, closing the switch 84, and the lower end of the electrode 19 is the arc length distance above the article to be welded.

The closing of microswitch 84 causes energization of both the time delay relay coil 85 and the relay coil 77. Contacts 76 and 78 of relay coil 77 then close, while contact 79 of relay coil 77 opens. The contact 82 of the time delay relay 83 remains closed, however, since the dash pot operates to delay the effects of the energization of the coil 85.

The opening of contact 79 de-energizes the solenoid 20, which releases the solenoid core 21 and allows the yoke 22, barrel 17, electrode 19, etc., to drop until the electrode 19 contacts the article to be welded.

This completes a direct current circuit from the generator 68 through the relay coil 71, causing the contact 72 of relay coil 71 to close. A circuit is thereby completed from line 74 through contact 78, contact 72, contact 76, and relay coil 70 to line 75. Relay coil 70 is then energized, causing it to close its contacts 69, 80, and 81.

Contact 69, in closing, completes the main welding circuit and also by-passes and de-energizes coil 71, which allows contact 72 to open. Energization of relay coil 70 is nevertheless maintained through contact 80 of relay coil 70, with the circuit being traceable from line 74 through contact 78, contact 80, contact 76, and relay coil 70 to line 75.

The closing of contact 81 re-energizes the solenoid 20, since contact 78 is closed. The solenoid core 21 is then attracted upwardly, elevating yoke 22, barrel 17, rod 18, and electrode 19, and striking the arc. The arc is maintained for the desired period, depending on the setting of the dash pot of the time delay relay 83, until the contact 82 opens and de-energizes relay coil 77.

De-energization of coil 77 causes its contacts 78 and 76 to open and contact 79 to close. The coil 70 is then de-energized and the welding current shut off, but solenoid 20 is energized through contact 79 and the electrode 19 is maintained in elevated position.

Current flowing through microswitch 84 keeps the time delay relay coil 85 in energized condition and prevents contact 82 from closing and starting the cycle again.

The welder then moves the valve 13 to "off" position, which admits compressed air into the cylinder 10 and elevates the back plate 9, barrel 17, etc., allowing the microswitch 84 to open. The apparatus is then ready for another welding cycle as soon as the operator adjusts or replaces the article to be welded.

If the electrode 19 has not burned or broken off during the first welding cycle, the feeding ratchet 31 will not operate during the next welding cycle to cause the rod 18 and thus the electrode 19 to feed downwardly through the barrel 17. This is because the spring 35 and horizontal arm 32 of ratchet 31 will ride with the rod 18 and will not be limited in their movement by either of set screws 39 or 40, the apparatus having been adjusted, as previously described, to accomplish this result.

The breaking or burning off of the electrode 19 during one cycle of welding causes the feeding ratchet 31 to feed the rod 18 and electrode 19 downwardly through the barrel 17 during the following welding cycle, and thus keep the arc length constant. When the back plate 9 is in its lower position after the operator turns the valve 13 to "weld" position, de-energization of the solenoid 20 allows the yoke 22, barrel 17, rod 18, and electrode 19 to fall until the electrode 19 strikes the article to be welded.

For the first part, equal to the arc length, of this downward movement, the spring 35 of ratchet 31 will ride downwardly with the rod 18 and the short wide portion 36 of spring 35 will engage the lower set screw 40. For the remaining downward movement, equal to the amount of carbon burned off, the rod 18 will feed downwardly through the spring 35, with the holding ratchet 42 preventing the rod 18 from separating from the electrode 19.

Subsequent energization of the solenoid 20 to strike the arc causes the barrel 17, rod 18, and electrode 19 to be elevated for a distance equal to the desired arc length, until the horizontal arm 32 of ratchet 31 engages the upper set screw 39. The barrel 17 then continues to move upwardly for the remaining distance, equal to the amount of carbon burned off, until the solenoid core 21 and the barrel 17 are in their initial postitions. The rod 18 and electrode 19, however, are held stationary by the spring 35 and are thus fed through the barrel 17 to maintain the desired arc length.

The operation of the ratchet 48, which rotates the barrel 17 and electrode 19 between each weld, was described in connection with the detailed description of that element.

Various embodiments of the invention may be employed within the scope of the accompanying claims.

I claim:

1. In an arc welding apparatus adapted for use with a carbon electrode, a support, means movably mounted on said support to hold said electrode, means carried by said support to effect movement of said holding means from an initial position until said electrode engages the article to be welded and to subsequently return said holding means to said initial position, and means operably associated with said electrode to permit said electrode to move with said holding means until said electrode engages the article to be welded and to return with said holding means for a predetermined distance equal to the desired arc length, whereby said electrode feeds with respect to said holding means when the distance moved by said holding means on said return movement is greater than said predetermined arc length but does not so feed when the distance moved by said holding means on said return movement is equal to said predetermined arc length.

2. In an arc welding apparatus adapted for use with a carbon electrode, a support, means movably mounted on said support to hold said electrode, means carried by said support to effect movement of said holding means from an initial position until said movement is stopped by the engagement of said electrode with the article to be welded and to subsequently return said holding means to said initial position, and a movable member operably associated with said electrode, said member being adapted to permit feeding movement of said electrode relative thereto but to restrain said electrode against return movement relative thereto, and stop means to limit the movements of said member to a predetermined distance equal to the desired arc length.

3. In a device of the class described adapted for use with a carbon electrode, a support, means movably mounted on said support to resiliently hold said electrode, a solenoid and a solenoid core carried by said support and operably associated with said holding means to return said holding means to an initial position after said holding means has fallen from said initial position to the position assumed upon engagement of said electrode with the article to be welded, a rod mounted in said holding means in axial alignment with said electrode to feed the same, a ratchet member movably mounted on said support and adapted to allow downward movement of said rod through said ratchet member but to prevent upward movement of said rod therethrough, and upper and lower stops arranged on said support to limit the movements of said ratchet member to a predetermined distance equal to the desired arc length.

4. In an arc welding apparatus adapted for use with a carbon electrode, a support, means movably mounted on said support to hold said electrode, means carried by said support to effect movement of said holding means from an initial position until said movement is stopped by the engagement of said electrode with the article to be welded and to subsequently return said holding means to said initial position, a feeding ratchet movably mounted on said support and operably associated with said electrode, said ratchet including a binding member and stops disposed on said support to limit the movements of said binding member to a predetermined distance equal to the desired arc length, and a holding ratchet mounted on said holding means to prevent said electrode from moving upwardly therethrough, whereby said electrode moves with said holding means until said electrode engages the article to be welded and returns with said holding means until said electrode is separated from the article to be welded for a distance equal to said predetermined arc length.

5. In an arc welding apparatus adapted for use with a carbon electrode, a support, means movably mounted on said support to hold said electrode, means carried by said support to effect movement of said holding means from an initial position until said movement is stopped by the engagement of said electrode with the article to be welded and to subsequently return said holding means to said initial position, a feeding ratchet movably mounted on said support and operably associated with said electrode, said ratchet including a binding member and stops disposed on said support to limit the movements of said binding member to a predetermined distance equal to the desired arc length, and a rotating ratchet adapted to intermittently rotate said electrode to promote uniformity of the burning thereof, whereby said electrode moves with said holding means until said electrode engages the article to be welded and returns with said holding means until said electrode is separated from the article to be welded for a distance equal to said predetermined arc length, one of said movements being accompanied by rotation of said electrode.

6. In an arc welding apparatus adapted to weld with a carbon electrode, a frame structure, a movable support mounted in said frame, means carried by said frame to effect movement of said support to upper and lower positions, means movably mounted on said support to hold said electrode, means carried by said support to effect movement of said holding means from an initial position until said electrode engages the article to be welded and to subsequently return said holding means to said initial position, and means mounted on said support and operably associated with said electrode to prevent said electrode from returning with said holding means for a distance greater than the desired arc length.

7. In a device of the class described adapted for use with a carbon electrode, a frame structure, a movable support mounted in said frame, means carried by said frame to effect vertical movement of said support, stop means disposed on said frame to limit the downward movement of said support, means movably mounted on said support to hold said electrode, means carried by said support and operable when said support is in its lower position to effect movement of said holding means until said electrode engages the article to be welded and to subsequently return said holding means to its initial position, and means movably mounted on said support and operably associated with said electrode to permit said electrode to move with said holding means until said electrode engages the article to be welded and to return with said holding means for a predetermined distance equal to the desired arc length.

8. In a device of the class described adapted for use with a carbon electrode, a stationary frame structure, a movable support mounted in said frame, means carried by said frame to effect movement of said support to upper and lower positions, means movably mounted on said support to hold said electrode, a solenoid and solenoid core carried by said support and connected to said holding means, said solenoid and solenoid core being operable when said support is in its lower position to return said holding means to an initial position after the same has fallen therefrom to a position assumed upon engagement of said electrode with the article to be welded, a binding member operably associated with said electrode to allow downward movement of said electrode with respect to said binding member but to prevent upward movement with respect thereto, and stops disposed on said support to limit the movements of said binding member to a predetermined distance equal to the desired arc length.

9. In a device of the class described adapted for use with a carbon electrode, a frame structure, a support movably mounted in said frame, a cylinder supported by said frame, a piston mounted in said cylinder and connected to said support to effect vertical movement thereof, a stop disposed on said frame to arrest the downward movement of said support, means movably mounted on said support to hold said electrode, a solenoid and solenoid core carried by said support and connected to said holding means, said solenoid and solenoid core being operable when said support is in its lower position to return said holding means to an initial position after the same has fallen therefrom to a position assumed upon engagement of said electrode with the article to be welded, a member operably associated with said electrode to allow downward movement of said electrode with respect to said member but to prevent upward movement with respect thereto, and stops disposed on said support to limit the movements of said member to a predetermined distance equal to the desired arc length.

10. In a device of the class described adapted for use with a carbon electrode, a stationary frame structure, a movable support mounted in said frame, means carried by said frame to effect movement of said support to upper and lower positions, means movably mounted on said support to hold said electrode, means carried by said support to actuate said holding means, said actuating means being operable when said support is in its lower position to return said holding means to an initial position after the same has moved therefrom to a position assumed upon engagement of said electrode with the article to be welded, a movable member operably associated with said electrode to allow downward movement of said electrode with respect to said member but to prevent upward movement with respect thereto, stops disposed on said support to limit the movement of said binding member to a predetermined distance equal to the desired arc length, and a holding ratchet mounted on said holding means to prevent said electrode from moving upwardly therethrough.

11. In a device of the class described adapted for use with a carbon electrode, a stationary frame structure, a movable support mounted in said frame, means carried by said frame to effect movement of said support to upper and lower positions, means movably mounted on said support to hold said electrode, means carried by said support to actuate said holding means, said actuating means being operable when said support is in its lower position to return said holding means to an initial position after the same has moved therefrom to a position assumed upon engagement of said electrode with the article to be welded, a feeding ratchet mounted on said support and operably associated with said electrode, said ratchet including a binding member adapted to prevent upward movement of said electrode relative thereto and stops disposed on said support to limit the movement of said binding member to a predetermined distance equal to the desired arc length, and a rotating ratchet actuated by said actuating means and disposed to intermittently rotate said electrode to promote uniformity of the burning thereof.

12. In an arc welding apparatus adapted to weld with a vertically movable carbon electrode, a vertically movable support, electrode holding means movably mounted on said support, means carried by said support to actuate said holding means, said actuating means being operable to effect lowering of said holding means until said electrode engages the article to be welded and to subsequently elevate said holding means and electrode to strike the arc, a welding current circuit through said electrode, a welding current relay having a contact in said welding current circuit, and a time delay relay system actuated by movement of said support to its lower position and electrically connected with said actuating means and said welding current relay to control the same to cause a weld of predetermined duration to be made.

13. In an arc welding apparatus adapted to weld with a carbon electrode, a frame structure, a support movably mounted in said frame, means carried by said frame to effect movement of said support to upper and lower positions, electrode holding means mounted on said support for vertical movement with respect thereto, means carried by said support to actuate said holding means, said actuating means being operable when said support is in its lower position to effect movement of said holding means until said movement is stopped by the engagement of said electrode with the article to be welded and to subsequently return said holding means to its initial position, a welding current circuit including said electrode, a welding current relay having a contact in said welding current circuit, and a relay system actuated by the movement of said support to its lower position and electrically connected with said actuating means and said welding current relay to control the same.

14. In an arc welding apparatus adapted to weld with a carbon electrode, a vertically movable support, electrode holding means movably mounted on said support, means carried by said support to actuate said holding means, said actuating means being operable to effect lowering of said holding means until said electrode engages the article to be welded and to subsequently elevate said holding means to its initial position, means movably mounted on said support and operably associated with said electrode to prevent the same from being elevated with said holding means for a distance greater than the desired arc length, a welding current circuit including said electrode, a welding current relay having a contact in said welding current circuit, and a time delay relay system actuated by movement of said support to its lower position and electrically connected with said actuating means and said welding current relay to control the same to cause a weld of predetermined duration to be made.

15. In an arc welding apparatus adapted to weld with a carbon electrode, a frame structure, a support movably mounted in said frame, means carried by said frame to effect movement of said support to upper and lower positions, electrode holding means mounted on said support for vertical movement with respect thereto, means carried by said support to actuate said holding means, said actuating means being operable when said support is in its lower position to effect movement of said holding means until said movement is stopped by the engagement of said electrode with the article to be welded and to subsequently return said holding means to its initial position, feeding means movably mounted on said support and operably associated with said electrode, said feeding means including a member adapted to allow downward movement of said electrode with respect to said member but to prevent upward movement of said electrode with respect thereto, a welding current circuit including said electrode, a welding current relay having a contact in said welding current circuit, and a relay system actuated by the movement of said support to its lower position and electrically connected with said actuating means and said welding current relay to control the same.

16. In an arc welding apparatus adapted to weld with a carbon electrode, a frame structure, a movable support mounted in said frame, means carried by said frame to effect movement of said support to upper and lower positions, means movably mounted on said support to hold said electrode, actuating means carried by said support to effect movement of said holding means from an initial position until said electrode engages the article to be welded and to subsequently return said holding means to said initial position, means mounted on said support and operably associated with said electrode to prevent said electrode from returning with said holding means for a distance greater than the desired arc length, a welding current circuit including said electrode, a welding current relay having a contact in said welding current circuit, and a time delay relay system electrically connected with said actuating means and said welding current relay to control the same to cause a weld of predetermined duration to be made.

17. In a relay system adapted to be employed with an arc welding apparatus having a welding circuit connected to a source of welding current, a carbon electrode in said welding circuit, and electrically operated means to effect movement of said electrode, a starting relay coil having a contact in the circuit of said electrode moving means to actuate said means and thereby effect movement of said electrode until the same engages the article to be welded, a welding current relay coil having a welding current contact in said welding circuit, a relay coil connected in shunt with said welding current contact and having a contact in the circuit of said welding current relay coil to energize said coil when said electrode engages the article to be welded and thus cause the closing of said welding current contact to complete said welding circuit, a holding circuit connected to maintain the energization of said welding current relay coil when said shunt relay coil is de-energized by the closing of said welding current contact, a second contact of said welding current relay coil connected in the circuit of said electrode moving means in parallel with said starting relay contact to actuate said electrode moving means and cause said electrode to be separated from the article to be welded to strike the arc, and time delay means to open said welding circuit at the end of a predetermined period after the closing thereof.

18. In an arc welding apparatus for automatically establishing and breaking a welding arc in predetermined relation to effect arc spotting, comprising an electrode, a solenoid normally energized to support the electrode a predetermined arc length distance above the work, trip means to open the circuit of said solenoid and thereby drop the electrode into contact with the work and close the welding circuit, a pair of relays energized respectively by said trip means and the closing of the welding circuit and having their contacts in series to energize a third relay operable to shunt said relay closed by the welding circuit and to provide a substitute closing circuit for said third relay, said third relay additionally energizing the said solenoid to effect striking of the arc between the electrode and a work piece, and time delay means to open the circuit of the relay previously energized by said trip means to de-energize said third relay and thereby extinguish the arc with the electrode held in raised position by said normally energized solenoid.

19. An arc welding apparatus for automatically establishing and breaking a welding arc in repeated succession and having a welding head adapted to strike and maintain an arc between an electrode and a work piece disposed in a position of relative inaccessibility, comprising a movable support for the welding head, means to move the support to and from operative position for said welding head, an electric circuit for said welding head adapted to effect automatic operation of the same for a predetermined work cycle, switch means in said circuit and disposed in the path of movement of said support to be actuated to initiate the welding cycle by movement of the support to position the welding head operatively to the work piece, and time delay switch means in said circuit responsive to said initiation of the welding cycle to terminate the same.

PERRY ANDERSON.

References Cited in the file of this patent

UNITED STATES PATENTS

| Number | Name | Date |
|---|---|---|
| 1,493,440 | Streson | May 6, 1924 |
| 1,930,290 | Streson | Oct. 10, 1933 |
| 2,460,990 | Kratz et al. | Feb. 8, 1949 |
| 2,461,798 | Anderson | Feb. 15, 1949 |
| 2,550,495 | Pilia | Apr. 24, 1951 |